United States Patent
Adib et al.

(10) Patent No.: US 12,297,139 B2
(45) Date of Patent: *May 13, 2025

(54) GLASS, GLASS-CERAMIC AND CERAMIC ARTICLES WITH GRADED PROTECTIVE COATINGS HAVING HARDNESS AND STRENGTH

(71) Applicant: CORNING INCORPORATED, Corning, NY (US)

(72) Inventors: Kaveh Adib, Corning, NY (US); Guangli Hu, Summit, NJ (US); William Joseph Hurley, Corning, NY (US); Dana Ianson, Westfield, PA (US); Lin Lin, Painted Post, NY (US); Santona Pal, Corning, NY (US); James Joseph Price, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/418,471

(22) Filed: Jan. 22, 2024

(65) Prior Publication Data
US 2024/0158293 A1     May 16, 2024

Related U.S. Application Data

(63) Continuation of application No. 18/101,668, filed on Jan. 26, 2023, now Pat. No. 11,905,203, which is a
(Continued)

(51) Int. Cl.
*B32B 15/04* (2006.01)
*B32B 17/06* (2006.01)
(Continued)

(52) U.S. Cl.
CPC ............ *C03C 17/245* (2013.01); *C03C 3/091* (2013.01); *C03C 3/097* (2013.01); *C03C 17/225* (2013.01);
(Continued)

(58) Field of Classification Search
CPC .................................................. C03C 2217/91
(Continued)

(56) References Cited

U.S. PATENT DOCUMENTS

| | | |
|---|---|---|
| 4,125,640 A | 11/1978 | Conant et al. |
| 4,890,783 A | 1/1990 | Li |

(Continued)

FOREIGN PATENT DOCUMENTS

| | | |
|---|---|---|
| CN | 1052473 A | 6/1991 |
| CN | 105408774 A | 3/2016 |

(Continued)

OTHER PUBLICATIONS

Chinese Patent Application No. 201880075193.3, Office Action dated Jan. 5, 2022, 18 pages (11 pages of English Translation and 7 pages of Original Document), Chinese Patent Office.
(Continued)

*Primary Examiner* — Lauren R Colgan
(74) *Attorney, Agent, or Firm* — William J. Tucker

(57) ABSTRACT

An article is described herein that includes: a substrate having a glass, glass-ceramic or a ceramic composition and comprising a primary surface; and a protective film disposed on the primary surface. The protective film comprises a thickness of greater than 1.5 microns and a maximum hardness of greater than 15 GPa at a depth of 500 nanometers, as measured on the film disposed on the substrate. Further, the protective film comprises a metal oxynitride that is graded such that an oxygen concentration in the film varies by 1.3 or more atomic %. In addition, the substrate
(Continued)

comprises an elastic modulus less than an elastic modulus of the film.

11 Claims, 7 Drawing Sheets

Related U.S. Application Data continuation of application No. 16/651,850, filed as application No. PCT/US2018/053088 on Sep. 27, 2018, now Pat. No. 11,591,258.

(60) Provisional application No. 62/565,425, filed on Sep. 29, 2017.

(51) Int. Cl.
| | |
|---|---|
| C03C 3/091 | (2006.01) |
| C03C 3/097 | (2006.01) |
| C03C 17/22 | (2006.01) |
| C03C 17/245 | (2006.01) |

(52) U.S. Cl.
CPC .... *C03C 2217/281* (2013.01); *C03C 2217/29* (2013.01); *C03C 2217/78* (2013.01); *C03C 2217/91* (2013.01); *C03C 2218/155* (2013.01)

(58) Field of Classification Search
USPC .......................................................... 428/697
See application file for complete search history.

(56) References Cited

U.S. PATENT DOCUMENTS

| | | | |
|---|---|---|---|
| 6,495,251 B1 | 12/2002 | Arbab et al. | |
| 6,589,659 B1 | 7/2003 | Imai et al. | |
| 6,667,121 B2 | 12/2003 | Wang | |
| 8,409,716 B2 | 4/2013 | Schultz et al. | |
| 9,110,230 B2* | 8/2015 | Koch, III | C03C 3/091 |
| 10,160,688 B2 | 12/2018 | Amin et al. | |
| 11,591,258 B2* | 2/2023 | Adib | C03C 17/245 |
| 11,667,565 B2* | 6/2023 | Koch, III | C03C 17/245 |
| | | | 428/336 |
| 11,905,203 B2* | 2/2024 | Adib | C03C 17/245 |
| 2004/0086723 A1 | 5/2004 | Thomsen et al. | |
| 2006/0008656 A1 | 1/2006 | Veerasamy | |
| 2014/0334006 A1 | 11/2014 | Adib et al. | |
| 2014/0377522 A1* | 12/2014 | Koch, III | C03C 17/3435 |
| | | | 428/428 |
| 2015/0079398 A1 | 3/2015 | Amin et al. | |
| 2015/0259244 A1* | 9/2015 | Amin | G06F 1/1637 |
| | | | 428/410 |
| 2016/0083835 A1* | 3/2016 | Adib | C23C 16/30 |
| | | | 428/332 |
| 2019/0337841 A1* | 11/2019 | Hart | C23C 14/10 |
| 2019/0352226 A1 | 11/2019 | Harris et al. | |

FOREIGN PATENT DOCUMENTS

| | | |
|---|---|---|
| CN | 105593184 A | 5/2016 |
| CN | 105874356 A | 8/2016 |
| CN | 105980323 A | 9/2016 |
| CN | 106604900 A | 4/2017 |
| JP | 2014-025061 A | 2/2014 |
| WO | 2015/038843 A1 | 3/2015 |

OTHER PUBLICATIONS

Fisher-Cripps; "Critical Review of Analysis and Interpretation of Nanoindentation Test Data"; Surface and Coating Technology; 200 pp. 4153-4165 (2006).

Hay et al; "Continuous Stiffness Measurement During Instrumented Indentation Testing"; Experimental Techniques, 34 (3); pp. 86-94 (2010).

Hutchinson et al; "Mixed Mode Cracking in Layered Materials"; Advances in Applied Mechanics, vol. 29; (1992) 160 Pages.

International Search Report and Written Opinion of the International Searching Authority; PCT/US2018/053088; Mailed Dec. 17, 2018; 10 Pages; European Patent Office.

Kitiel; "Introduction to Solid State Physics"; Seventh Edition, John Wiley & Sons, Inc. NY, 1996; pp. 611-627.

Shackelford, "Introduction to Materials Science for Engineers"; Sixth Edition, Pearson Prentice Hall, NJ, 2005; pp. 404-418.

Smart and Moore; "Solid State Chemistry, an Introduction"; Chapman & Hall University and Professional Division, London, 1992 pp. 136-151.

Voevodin et al; "Design of A Ti/TiC/DLC Functionally Gradient Coating Based on Studies of Structural Transistions in Ti—C Thin Films"; Thin Solid Films, 298 (1997) 107-115.

* cited by examiner

GLASS, GLASS-CERAMIC AND CERAMIC ARTICLES WITH GRADED PROTECTIVE COATINGS HAVING HARDNESS AND STRENGTH

CLAIM OF PRIORITY

This application is a continuation application of U.S. application Ser. No. 18/101,668, filed Jan. 26, 2023, now U.S. Pat. No. 11,905,203, which is a continuation application of U.S. application Ser. No. 16/651,850, filed Mar. 27, 2020, now U.S. Pat. No. 11,591,258, which is a National Stage application under 35 U.S.C. § 371 of International Application No. PCT/US2018/053088 filed on Sep. 27, 2018, which claims the benefit of priority to U.S. Provisional Application Ser. No. 62/565,425, filed on Sep. 29, 2017, the content of each are relied upon and incorporated herein by reference in their entirety.

FIELD

The present disclosure generally relates to strong, hard and scratch-resistant articles with glass, glass-ceramic and ceramic substrates and protective films, particularly, graded metal oxynitride and metal nitride protective films.

BACKGROUND

Glass, glass-ceramic and ceramic materials, many of which are configured or otherwise processed with various strength-enhancing features, are prevalent in various displays and display devices of many consumer electronic products. For example, chemically strengthened glass is favored for many touch-screen products, including cell phones, music players, e-book readers, notepads, tablets, laptop computers, automatic teller machines, and other similar devices. Many of these glass, glass-ceramic and ceramic materials are also employed in displays and display devices of consumer electronic products that do not have touch-screen capability, but are prone to mechanical contact, including desktop computers, laptop computers, elevator screens, equipment displays, and others.

Glass, glass-ceramic and ceramic materials, as processed in some cases with strength-enhancing features, are also prevalent in various applications desiring display- and/or optic-related functionality and demanding mechanical property considerations. For example, these materials can be employed as cover lenses, substrates and housings for watches, smartphones, retail scanners, eyeglasses, eyeglass-based displays, outdoor displays, automotive displays and other related applications. These materials can also be employed in vehicular windshields, vehicular windows, vehicular moon-roof, sun-roof and panoramic roof elements, architectural glass, residential and commercial windows, and other similar applications.

As used in these display and related applications, these glass, glass-ceramic and ceramic materials are often coated with transparent and semi-transparent, scratch-resistant films to increase wear resistance and resist the development of mechanically-induced defects that can otherwise lead to premature failure. These conventional scratch-resistant coatings and films, however, are often prone to low strain-to-failure. As a result, the articles employing these films can be characterized by good wear resistance, but often at the expense of reductions in other mechanical properties, including strength and impact resistance.

In view of these considerations, there is a need for scratch-resistant articles with glass, glass-ceramic and ceramic substrates and protective films that retain other mechanical properties, including article strength, with no significant increase in cost and/or article dimensions.

SUMMARY

An aspect of this disclosure pertains to an article that includes: a substrate having a glass, glass-ceramic or a ceramic composition and comprising a primary surface; and a protective film disposed on the primary surface. The protective film comprises a thickness of greater than 1.5 microns and a maximum hardness of greater than 15 GPa at a depth of 500 nanometers, as measured on the film disposed on the substrate. Further, the protective film comprises a metal oxynitride that is graded such that an oxygen concentration in the film varies by 1.3 or more atomic %. In addition, the substrate comprises an elastic modulus less than an elastic modulus of the film.

In embodiments of this aspect, the protective film comprises an aluminum oxynitride, a silicon aluminum oxynitride or a silicon oxynitride. Further, the protective film can comprise a metal oxynitride that is graded such that an oxygen concentration through the thickness of the film varies by 2 or more atomic %. In some implementations of this aspect, the protective film defines an interface at the primary surface of the substrate and an exposed surface opposed from the interface, and the oxygen concentration varies by 1.3 or more %, or by 2.0 or more %, as measured in atomic percent (or atomic fraction) from the exposed surface to a depth within the thickness of the film.

A further aspect of this disclosure pertains to an article that includes: a substrate having a glass, glass-ceramic or a ceramic composition and comprising a primary surface; and a protective film disposed on the primary surface. The protective film comprises a thickness of greater than 1.5 microns and a maximum hardness of greater than 15 GPa at a depth of 500 nanometers, as measured on the film disposed on the substrate. Further, the protective film comprises a metal nitride that is graded such that a nitrogen concentration in the film varies by 1.3 or more atomic %. In addition, the substrate comprises an elastic modulus less than an elastic modulus of the film.

In embodiments of the foregoing aspect, the protective film comprises an aluminum nitride or a silicon nitride. Further, the protective film can comprise a metal nitride that is graded such that a nitrogen concentration through the thickness of the film varies by 2 or more atomic %. In some implementations of this aspect, the protective film defines an interface at the primary surface of the substrate and an exposed surface opposed from the interface, and the nitrogen concentration varies by 1.3 or more %, or by 2.0 or more %, as measured in atomic percent from the exposed surface to a depth within the thickness of the film.

In embodiments of the foregoing aspects, the protective film comprises a thickness in the range of about 1.5 microns to about 20 microns. In some embodiments, the thickness ranges from about 1.5 microns to about 15 microns. In some embodiments, the thickness ranges from about 1.5 microns to about 10 microns.

In other embodiments of the foregoing aspects, the protective film further comprises an elastic modulus of greater than 160 GPa, greater than 180 GPa, or greater than 200 GPa. According to some implementations, the protective film comprises an elastic modulus of greater than 200 GPa and a maximum hardness of greater than 17 GPa at a depth of 500 nanometers, as measured on the film disposed on the substrate.

In further embodiments of the foregoing aspects, each of the substrate and the film comprises an optical transmittance of 20% or more in the visible spectrum. In some embodiments, the article is further characterized by a crack onset strain (COS) failure level of about 0.5 or more %.

According to some implementations of the foregoing aspects, the substrate has a glass composition and further comprises a compressive stress region that extends from the primary surface to a depth of compressive stress (DOC) in the substrate, the compressive stress region comprising a maximum compressive stress (CS) of 150 MPa with a DOC at 10 microns or deeper.

In some embodiments of these aspects, a consumer electronic product is provided that includes: a housing that includes a front surface, a back surface and side surfaces; electrical components that are at least partially inside the housing; and a display at or adjacent to the front surface of the housing. Further, one of the foregoing articles is at least one of: disposed over the display and disposed as a portion of the housing.

In some additional embodiments of these aspects, a vehicle display system is provided that includes: a housing that includes a front surface, a back surface and side surfaces; electrical components that are at least partially inside the housing; and a display at or adjacent to the front surface of the housing. Further, one of the foregoing articles is at least one of disposed over the display and disposed as a portion of the housing.

According to another aspect of the disclosure, a method of making an article is provided that includes: forming a substrate having a glass, glass-ceramic or ceramic composition and comprising a primary surface; and disposing a protective film over the primary surface of the substrate with a vacuum deposition process. The protective film comprises a thickness of greater than 1.5 microns and a maximum hardness of greater than 15 GPa at a depth of 500 nanometers, as measured on the film disposed on the substrate. Further, the protective film comprises a metal oxynitride or a metal nitride that is graded such that at least one of an oxygen concentration and a nitrogen concentration in the film varies by 1.3 or more atomic %. In addition, the substrate comprises an elastic modulus less than an elastic modulus of the film.

In embodiments of the method, the metal oxynitride or the metal nitride is graded during the step of disposing the protective film by varying a respective concentration of a reactive oxygen gas or a reactive nitrogen gas. Further, the step of disposing the protective film is conducted with a sputtering process in some embodiments.

Additional features and advantages will be set forth in the detailed description which follows, and will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the disclosure and the appended claims.

The accompanying drawings are included to provide a further understanding of principles of the disclosure, and are incorporated in, and constitute a part of, this specification. The drawings illustrate one or more embodiment(s) and, together with the description, serve to explain, by way of example, principles and operation of the disclosure. It is to be understood that various features of the disclosure disclosed in this specification and in the drawings can be used in any and all combinations. By way of non-limiting examples, the various features of the disclosure may be combined with one another according to the following embodiments.

According to a first embodiment, an article is provided that includes: a substrate having a glass, glass-ceramic or ceramic composition and comprising a primary surface; and a protective film disposed on the primary surface of the substrate. The protective film comprises a thickness of greater than 1.5 microns and a maximum hardness of greater than 15 GPa at a depth of 500 nanometers, as measured on the film disposed on the substrate. Further, the protective film comprises a metal oxynitride that is graded such that an oxygen concentration in the film varies by 1.3 or more atomic %. Further, the substrate comprises an elastic modulus less than an elastic modulus of the film.

According to a second embodiment, the article of embodiment 1 is provided, wherein the protective film comprises a metal oxynitride that is graded such that the oxygen concentration through the thickness of the film varies by 2 or more atomic %.

According to a third embodiment, the article of embodiment 1 or embodiment 2 is provided, wherein the protective film comprises an aluminum oxynitride, a silicon aluminum oxynitride or a silicon oxynitride.

According to a fourth embodiment, the article of any one of embodiments 1-3 is provided, wherein the protective film further comprises an elastic modulus of greater than 160 GPa.

According to a fifth embodiment, the article of any one of embodiments 1-3 is provided, wherein the protective film further comprises an elastic modulus of greater than 200 GPa and a maximum hardness of greater than 17 GPa at a depth of 500 nm, as measured on the film disposed on the substrate.

According to a sixth embodiment, the article of any one of embodiments 1-5 is provided, wherein each of the substrate and the film comprises an optical transmittance of 20% or more in the visible spectrum.

According to a seventh embodiment, the article of any one of embodiments 1-6 is provided, wherein the article comprises a COS failure level of about 0.5 or more %.

According to an eighth embodiment, the article of any one of embodiments 1-7 is provided, wherein the substrate comprises a thickness from about 0.2 mm to about 1 mm.

According to a ninth embodiment, the article of embodiment 1 is provided, wherein the protective film defines an interface at the primary surface of the substrate and an exposed surface opposed from the interface, and further wherein the oxygen concentration varies by 1.3 or more atomic % from the exposed surface to a depth within the thickness of the film.

According to a tenth embodiment, the article of embodiment 2 is provided, wherein the protective film defines an interface at the primary surface of the substrate and an exposed surface opposed from the interface, and further wherein the oxygen concentration varies by 2 or more atomic % from the exposed surface to a depth within the thickness of the film.

According to an eleventh embodiment, the article of any one of embodiments 1-10 is provided, wherein the substrate comprises a glass composition and further comprises a compressive stress region that extends from the primary surface to a depth of compressive stress (DOC) in the substrate, the compressive stress region comprising a maximum compressive stress (CS) of 150 MPa with a DOC at 10 microns or deeper.

According to a twelfth embodiment, an article is provided that includes: a substrate having a glass, glass-ceramic or ceramic composition comprising a primary surface; and a protective film disposed on the primary surface of the substrate. The protective film comprises a thickness of greater than 1.5 microns and a maximum hardness of greater than 15 GPa at a depth of 500 nanometers, as measured on the film disposed on the substrate. The protective film comprises a metal nitride that is graded such that a nitrogen concentration in the film varies by 1.3 or more atomic %. Further, the substrate comprises an elastic modulus less than an elastic modulus of the film.

According to a thirteenth embodiment, the article of embodiment 12 is provided, wherein the protective film comprises a metal nitride that is graded such that the nitrogen concentration through the thickness of the film varies by 2 or more atomic %.

According to a fourteenth embodiment, the article of embodiment 12 or 13 is provided, wherein the protective film comprises an aluminum nitride or a silicon nitride.

According to a fifteenth embodiment, the article of any one of embodiments 12-14 is provided, wherein the protective film further comprises an elastic modulus of greater than 160 GPa.

According to a sixteenth embodiment, the article of any one of embodiments 12-14 is provided, wherein the protective film further comprises an elastic modulus of greater than 200 GPa and a maximum hardness of greater than 17 GPa at a depth of 500 nanometers, as measured on the film disposed on the substrate.

According to a seventeenth embodiment, the article of any one of embodiments 12-16 is provided, wherein each of the substrate and the film comprises an optical transmittance of 20% or more in the visible spectrum.

According to an eighteenth embodiment, the article of any one embodiments 12-17 is provided, wherein the article comprises a COS failure level of about 0.5 or more %.

According to a nineteenth embodiment, the article of any one embodiments 12-18 is provided, wherein the substrate comprises a thickness from about 0.2 mm to about 1 mm.

According to a twentieth embodiment, the article of embodiment 12 is provided, wherein the protective film forms an interface at the primary surface of the substrate and an exposed surface opposed from the interface, and further wherein the nitrogen concentration varies by 1.3 or more atomic % from the exposed surface to a depth within the thickness of the film.

According to a twenty-first embodiment, the article of embodiment 13 is provided, wherein the protective film defines an interface at the primary surface of the substrate and an exposed surface opposed from the interface, and further wherein the nitrogen concentration varies by 2 or more atomic % from the exposed surface to a depth within the thickness of the film.

According to a twenty-second embodiment, the article of any one embodiments 12-14 is provided, wherein the substrate comprises a glass composition and further comprises a compressive stress region that extends from the primary surface to a depth of compressive stress (DOC) in the substrate, the compressive stress region comprising a maximum compressive stress (CS) of 150 MPa with a DOC at 10 microns or deeper.

According to a twenty-third embodiment, a consumer electronic product is provided that includes: a housing comprising front, back and side surfaces; electrical components that are at least partially inside the housing; and a display at or adjacent to the front surface of the housing. Further, the article of any one of embodiments 1-22 is at least one of disposed over the display and disposed as a portion of the housing.

According to a twenty-fourth embodiment, a vehicle display system is provided that includes: a housing comprising front, back and side surfaces; electrical components that are at least partially inside the housing; and a display at or adjacent to the front surface of the housing. Further, the article of any one of embodiments 1-22 is at least one of disposed over the display and disposed as a portion of the housing.

According to a twenty-fifth embodiment, a method of making an article is provided that includes: forming a substrate having a glass, glass-ceramic or ceramic composition and comprising a primary surface; and disposing a protective film over the primary surface of the substrate with a vacuum deposition process. The protective film comprises a thickness of greater than 1.5 microns and a maximum hardness of greater than 15 GPa at a depth of 500 nanometers, as measured on the film disposed on the substrate. The protective film comprises a metal oxynitride or a metal nitride that is graded such that at least one of an oxygen concentration and a nitrogen concentration in the film varies by 1.3 or more atomic % in the film. Further, the substrate comprises an elastic modulus less than an elastic modulus of the film.

According to a twenty-sixth embodiment, the method of embodiment 25 is provided, wherein the metal oxynitride or the metal nitride is graded during the step of disposing the protective film by varying a respective concentration of a reactive oxygen gas or a reactive nitrogen gas.

According to a twenty-seventh embodiment, the method of embodiment 25 or embodiment 26 is provided, wherein the step of disposing the protective film is conducted with a sputtering process.

BRIEF DESCRIPTION OF THE DRAWINGS

These and other features, aspects and advantages of the present disclosure are better understood when the following detailed description of the disclosure is read with reference to the accompanying drawings, in which.

DETAILED DESCRIPTION

Figure 1:
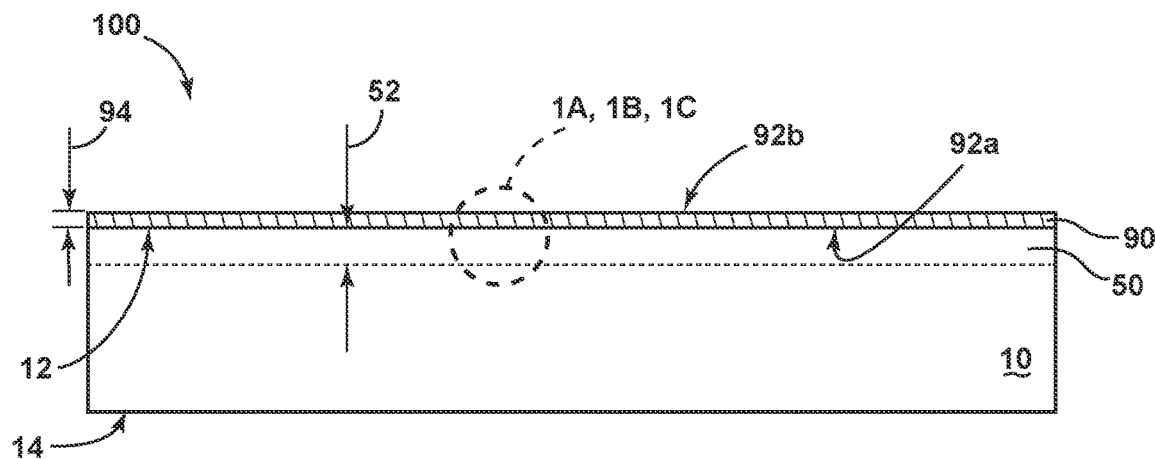
FIG. 1 is a cross-sectional schematic view of an article comprising a glass, glass-ceramic or ceramic substrate with a protective film disposed over the substrate, according to some embodiments of the disclosure.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Ranges can be expressed herein as from "about" one particular value, and/or to "about" another particular value. As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the singular forms "a," "an" and "the" include plural referents unless the context clearly dictates otherwise. Thus, for example, reference to a "component" includes embodiments having two or more such components, unless the context clearly indicates otherwise.

Embodiments of the disclosure generally pertain to strong, hard and scratch-resistant articles with glass, glass-ceramic and ceramic substrates and protective films, particularly, graded metal oxynitride and metal nitride protective films with varying oxygen and/or nitrogen concentration levels. These graded protective films can be disposed on one or more primary surfaces of these substrates and can comprise a metal oxynitride or a metal nitride that is graded such that at least one of an oxygen concentration and a nitrogen concentration in the film varies by 1.3 or more atomic %. Further, the protective films can be characterized by substantial transparency, e.g., an optical transmittance of 20% or more in the visible spectrum. These protective films can also be characterized by a high hardness, e.g., greater than 15 GPa at a depth of 500 nm. The protective films can also be characterized with a high elastic modulus of greater than 160 GPa and/or that is greater than an elastic modulus of the substrate. The disclosure is also directed to articles having a glass substrate with a compressive stress region, and a protective film disposed on one or more of primary surfaces of the substrate. The Young's (or elastic) modulus values for the substrate recited in this disclosure refers to a value as measured by a resonant ultrasonic spectroscopy technique of the general type set forth in ASTM E2001-13, titled "Standard Guide for Resonant Ultrasound Spectroscopy for Defect Detection in Both Metallic and Non-metallic Parts."

Referring to FIG. 1, an article 100 is depicted that includes a substrate 10 comprising a glass, glass-ceramic or ceramic composition. That is, the substrate 10 may include one or more of glass, glass-ceramic, or ceramic materials therein. The substrate 10 comprises a pair of opposing primary surfaces 12, 14. Further, the article 100 includes a protective film 90 with an outer surface 92b disposed over the primary surface 12. As also shown in FIG. 1, the protective film 90 has a thickness 94. In embodiments, the article 100 can include one or more protective films 90 disposed over one or more primary surfaces 12, 14 of the substrate 10. As shown in FIG. 1, one or more of the films 90 are disposed over the primary surface 12 of the substrate 10. According to some implementations, the protective film or films 90 can also be disposed over the primary surface 14 of the substrate 10.

According to some implementations, the article 100 depicted in FIG. 1 includes a substrate 10 that comprises a glass, glass-ceramic or a ceramic composition and a primary surface 12, 14; and a protective film 90 disposed on the primary surface 12, 14. The protective film 90 includes at least one of a metal oxynitride and a metal nitride that is graded such that an oxygen and/or nitrogen concentration in the film varies by 1.3 or more atomic %, by 1.5 or more atomic %, or by 2 or more atomic %. Further, in embodiments, the grading in the protective film 90 is substantially in the thickness direction of the film. In some aspects of the article 100, the oxygen and/or nitrogen concentration in the protective film 90 can vary by about 1.3 or more %, for example 1.4%, 1.5%, 1.6%, 1.7%, 1.8%, 1.9%, 2%, 2.1%, 2.2%, 2.3%, 2.4%, 2.5%, 3%, 3.5%, 4%, 4.5%, 5%, 5.5%, 6%, 6.5%, 7%, 7.5%, 8%, 8.5%, 9%, 9.5%, 10%, or more in some implementations. The protective film 90 can also be characterized by a thickness 94 of greater than 1.5 microns. In some aspects, the thickness 94 of the protective film 90 is greater than 0.1 microns, 0.2 microns, 0.3 microns, 0.4 microns, 0.5 microns, 0.6 microns, 0.7 microns, 0.8 microns, 0.9 microns, 1 micron, 1.1 microns, 1.2 microns, 1.3 microns, 1.4 microns, 1.5 microns, 1.6 microns, 1.7 microns, 1.8 microns, 1.9 microns, 2 microns, 2.1 microns, 2.2 microns, 2.3 microns, 2.4 microns, 2.5 microns, and other thickness levels between these lower threshold levels for the thickness 94. Thickness of the thin film elements (e.g., the protective film 90 and any other film elements disposed on or below the film 90) was measured by scanning electron microscopy (SEM) of a cross-section, by optical ellipsometry (e.g., by an n & k analyzer), or by thin film reflectometry. For multiple layer elements (e.g., a protective film 90 and a fluorosilane anti-fingerprint coating disposed on the film 90 (not shown)), thickness measurements by SEM are preferred.

Referring again to the article 100 depicted in FIG. 1, each of the substrate 10 and the film 90 can comprise an optical transmittance of 20% or more in the visible spectrum. In some implementations, one or both of the substrate 10 and the film 90 can comprise an optical transmittance of 20% or more, 30% or more, 40% or more, 50% or more, 60% or more, 70% or more, 80% or more, 90% or more within the visible spectrum, and all values between these optical transmittance levels.

Still referring to the article 100 depicted in FIG. 1, the protective film 90 comprises a maximum hardness of greater than 15 GPa at a depth of 500 nm, as measured on the film 90 on the substrate 10 with a Berkovitch nanoindenter. In some implementations, the protective film 90 comprises a maximum hardness of greater than 15 GPa, 16 GPa, 17 GPa, 18 GPa, 19 GPa, 20 GPa, 21 GPa, 22 GPa, 23 GPa, 24 GPa, 25 GPa, or even higher, at a depth of 500 nm, as measured with a Berkovitch nanoindenter, as described below. Further, the article 100 is configured such that the substrate 10 comprises an elastic modulus that is less than an elastic modulus of the protective film 90. In aspects of the article 100, the protective film 90 comprises an elastic modulus that is greater than 160 GPa, or greater than 200 GPa. In other aspects, the protective film 90 comprises an elastic modulus that is greater than 160 GPa, 170 GPa, 180 GPa, 190 GPa, 200 GPa, 210 GPa, 220 GPa, 230 GPa, 240 GPa, 250 GPa, or even higher.

According to some embodiments, the article 100 depicted in FIG. 1 employs a protective film 90 with an average hardness of 12 GPa or more. In some embodiments, the average hardness of these films can be greater than 12 GPa, 13 GPa, 14 GPa, 15 GPa, 16 GPa, 17 GPa, 18 GPa, 19 GPa, 20 GPa, 21 GPa, 22 GPa, 23 GPa, 24 GPa, 25 GPa, or even higher, at a depth of 500 nm, as measured with a Berkovitch nanoindenter. As used herein, the "average hardness value" and "the maximum hardness values" are reported as the respective average and maximum of a set of measurements on the outer surface 92b of the protective film 90 using a nanoindentation apparatus, such as a Berkovitch nanoindenter. The data from the same nanoidentation apparatus can also be employed to obtain elastic modulus values for the protective film 90. Unless specified otherwise, any reference to "hardness" refers to maximum hardness. Further, it should be understood that the hardness of thin film coatings, such as the protective film 90, as reported herein, was determined using widely accepted nanoindentation practices. (See Fischer-Cripps, A. C., Critical Review of Analysis and Interpretation of Nanoindentation Test Data, Surface & Coatings Technology, 200, 4153-4165 (2006) (hereinafter "Fischer-Cripps"); and Hay, J., Agee, P., and Herbert, E., Continuous Stiffness Measurement During Instrumented Indentation Testing, Experimental Techniques, 34 (3) 86-94 (2010) (hereinafter "Hay").) For coatings, it is typical to measure hardness as a function of indentation depth. So long as the coating is of sufficient thickness, it is then possible to isolate the properties of the coating from the resulting response profiles. It should be recognized that if the coatings are too thin (for example, less than ~500 nm), it may not be possible to completely isolate the coating properties as they can be influenced from the proximity of the substrate which may have different mechanical properties. (See Hay.) The methods used to report the properties herein are representative of the coatings themselves. The process is to measure hardness and modulus versus indentation depth out to depths approaching 1000 nm. In the case of hard coatings on a softer glass, the response curves will reveal maximum levels of hardness and modulus at relatively small indentation depths (less than or equal to about 200 nm). At deeper indentation depths, both hardness and modulus will gradually diminish as the response is influenced by the softer glass substrate. In this case, the coating hardness and modulus are taken to be those associated with the regions exhibiting the maximum hardness and modulus. At deeper indentation depths, the hardness and modulus will gradually increase due to the influence of the harder glass. These profiles of hardness and modulus versus depth can be obtained using either the traditional "Oliver and Pharr" approach (as described in Fischer-Cripps) or by the more efficient "continuous stiffness" approach (see Hay). The elastic modulus and hardness values reported herein for such thin films were measured using known diamond nanoindentation methods, as described above, with a Berkovich diamond indenter tip.

According to other implementations, the article 100 depicted in FIG. 1 includes a substrate 10 having a glass composition, comprising a primary surface 12, 14 and a compressive stress region 50. As shown in FIG. 1, the compressive stress region 50 extends from the primary surface 12 to a first selected depth 52 in the substrate. Nevertheless, some embodiments (not shown) include a comparable compressive stress region 50 that extends from the primary surface 14 to a second selected depth (not shown). Further, some embodiments (not shown) include multiple compressive stress regions 50 extending from the primary surfaces 12, 14 and/or edges of the substrate 10. As used herein, a "selected depth," (e.g., selected depth 52) "depth of compression" and "DOC" are used interchangeably to define the depth at which the stress in a substrate 10, as described herein, changes from compressive to tensile. DOC may be measured by a surface stress meter, such as an FSM-6000, or a scattered light polariscope (SCALP) depending on the ion exchange treatment. Where the stress in a substrate 10 having a glass composition is generated by exchanging potassium ions into the glass substrate, a surface stress meter is used to measure DOC. Where the stress is generated by exchanging sodium ions into the glass article, SCALP is used to measure DOC. Where the stress in the substrate 10 having a glass composition is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass substrates is measured by a surface stress meter. As also used herein, the "maximum compressive stress" is defined as the maximum compressive stress within the compressive stress region 50 in the substrate 10. In some embodiments, the maximum compressive stress is obtained at or in close proximity to the one or more primary surfaces 12, 14 defining the compressive stress region 50. In other embodiments, the maximum compressive stress is obtained between the one or more primary surfaces 12, 14 and the selected depth 52 of the compressive stress region 50.

In some embodiments of the article 100, as depicted in FIG. 1, the substrate 10 comprises a glass composition. The substrate 10, for example, can comprise a borosilicate glass, an aluminosilicate glass, soda-lime glass, chemically strengthened borosilicate glass, chemically strengthened aluminosilicate glass, and chemically strengthened soda-lime glass. In some embodiments, the glass may be alkali-free. The substrate 10 may have a selected length and width, or diameter, to define its surface area. The substrate 10 may have at least one edge between the primary surfaces 12, 14 of the substrate 10 defined by its length and width, or diameter. The substrate 10 may also have a selected thickness. In some embodiments, the substrate has a thickness of from about 0.2 mm to about 1.5 mm, from about 0.2 mm to about 1.3 mm, and from about 0.2 mm to about 1.0 mm. In other embodiments, the substrate has a thickness of from about 0.1 mm to about 1.5 mm, from about 0.1 mm to about 1.3 mm, or from about 0.1 mm to about 1.0 mm.

In some embodiments of the article 100, as depicted in exemplary form in FIG. 1, the substrate 10 is selected from a chemically strengthened aluminosilicate glass. In other embodiments, the substrate 10 is selected from chemically strengthened aluminosilicate glass having a compressive stress region 50 extending to a first selected depth 52 of greater than 10 lam, with a maximum compressive stress of greater than 150 MPa. In further embodiments, the substrate 10 is selected from a chemically strengthened aluminosilicate glass having a compressive stress region 50 extending to a first selected depth 52 of greater than 25 lam, with a maximum compressive stress of greater than 400 MPa. The substrate 10 of the article 100 may also include one or more compressive stress regions 50 that extend from one or more of the primary surfaces 12, 14 to a selected depth 52 (or depths) having a maximum compressive stress of greater than about 150 MPa, greater than 200 MPa, greater than 250 MPa, greater than 300 MPa, greater than 350 MPa, greater than 400 MPa, greater than 450 MPa, greater than 500 MPa, greater than 550 MPa, greater than 600 MPa, greater than 650 MPa, greater than 700 MPa, greater than 750 MPa, greater than 800 MPa, greater than 850 MPa, greater than 900 MPa, greater than 950 MPa, greater than 1000 MPa, and all maximum compressive stress levels between these values. In some embodiments, the maximum compressive stress is 2000 MPa or lower. In addition, the depth of compression (DOC) or first selected depth 52 can be set at 10 µm or greater, 15 µm or greater, 20 µm or greater, 25 µm or greater, 30 µm or greater, 35 µm or greater, and to even higher depths, depending on the thickness of the substrate 10 and the processing conditions associated with generating the compressive stress region 50. In some embodiments, the DOC is less than or equal to 0.3 times the thickness (t) of the substrate 10, for example 0.3 t, 0.28 t, 0.26 t, 0.25 t, 0.24 t, 0.23 t, 0.22 t, 0.21 t, 0.20 t, 0.19 t, 0.18 t, 0.15 t, or 0.1 t. Compressive stress, including surface compressive stress (CS) levels, is measured by a surface stress meter using commercially available instruments such as the FSM-6000 (i.e., an FSM), as manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety.

Similarly, with respect to glass-ceramics, the material chosen for the substrate 10 of the article 100 (see FIG. 1) can be any of a wide range of materials having both a glassy phase and a ceramic phase. Illustrative glass-ceramics include those materials where the glass phase is formed from a silicate, borosilicate, aluminosilicate, or boroaluminosilicate, and the ceramic phase is formed from β-spodumene, β-quartz, nepheline, kalsilite, or carnegieite. "Glass-ceramics" include materials produced through controlled crystallization of glass. In some embodiments, glass-ceramics have about 30% to about 90% crystallinity. Examples of suitable glass-ceramics may include $Li_2O$—$Al_2O_3$—$SiO_2$ system (i.e. LAS-System) glass-ceramics, $MgO$—$Al_2O_3$—$SiO_2$ system (i.e. MAS-System) glass-ceramics, $ZnO \times Al_2O_3 \times nSiO_2$ (i.e. ZAS system), and/or glass-ceramics that include a predominant crystal phase including β-quartz solid solution, β-spodumene, cordierite, and lithium disilicate. The glass-ceramic substrates may be strengthened using the chemical strengthening processes disclosed herein. In one or more embodiments, MAS-System glass-ceramic substrates may be strengthened in $Li_2SO_4$ molten salt, whereby an exchange of 2 $Li^+$ for $Mg^{2+}$ can occur.

With respect to ceramics, the material chosen for the substrate 10 of the article 100 (see FIG. 1) can be any of a wide range of inorganic crystalline oxides, nitrides, carbides, oxynitrides, carbonitrides, and/or the like. Illustrative ceramics include those materials having an alumina, aluminum titanate, mullite, cordierite, zircon, spinel, perovskite, zirconia, ceria, silicon carbide, silicon nitride, silicon aluminum oxynitride or zeolite phase.

In some implementations of the article 100 depicted in FIG. 1, the protective film 90 is graded and comprises an inorganic material, preferably a metal oxynitride or a metal nitride. For those articles 100 with a protective film 90 comprising a metal oxynitride, the protective film 90 can comprise an aluminum oxynitride ($AlO_xN_y$), a silicon aluminum oxynitride ($Si_uAl_xO_yN_z$) or a silicon oxynitride ($SiO_xN_y$), in some aspects. For those articles 100 with a protective film 90 comprising a metal nitride, the protective film 90 can comprise an aluminum nitride ($AlN_y$), a silicon nitride ($SiN_y$), or a silicon aluminum nitride ($SiAl_xN_y$) in some aspects.

As understood by those with ordinary skill in the field of the disclosure with regard to articles 100 comprising a protective film 90 having a metal oxynitride or a metal nitride composition, each of the subscripts, "u," "x," "y," and/or "z," can vary from >0.0 to 1, the sum of the subscripts will be less than or equal to 1, and the balance of the composition is the first element in the material (e.g., Si or Al). In addition, those with ordinary skill in the field can recognize that "$Si_uAl_xO_yN_z$" can be configured such that "u" equals zero and the material can be described as "$AlO_xN_y$". Still further, the foregoing compositions for the protective film 90 exclude a combination of subscripts that would result in a pure elemental form (e.g., pure silicon, pure aluminum metal, oxygen gas, etc.). Finally, those with ordinary skill in the art will also recognize that the foregoing compositions may include other elements not expressly denoted (e.g., hydrogen), which can result in non-stoichiometric compositions (e.g., $SiN_x$ vs. $Si_3N_4$). Accordingly, the foregoing materials for the protective film 90 can be indicative of the available space within a $SiO_2$—$Al_2O_3$—$SiN_x$—AlN or a $SiO_2$—$Al_2O_3$—$Si_3N_4$—AlN phase diagram, depending on the values of the subscripts in the foregoing composition representations.

As used herein, the "$AlO_xN_y$," "$SiO_xN_y$," and "$Si_uAl_xO_yN_z$" materials in the disclosure include various aluminum oxynitride, silicon oxynitride and silicon aluminum oxynitride materials, as understood by those with ordinary skill in the field of the disclosure, described according to certain numerical values and ranges for the subscripts, "u," "x," "y," and "z". That is, it is common to describe solids with "whole number formula" descriptions, such as $Al_2O_3$. It is also common to describe solids using an equivalent "atomic fraction formula" description such as $Al_{0.4}O_{0.6}$, which is equivalent to $Al_2O_3$. In the atomic fraction formula, the sum of all atoms in the formula is 0.4+0.6=1, and the atomic fractions of Al and O in the formula are 0.4 and 0.6, respectively. Atomic fraction descriptions are described in many general textbooks and atomic fraction descriptions are often used to describe alloys. (See, e.g.: (i) Charles Kittel, "Introduction to Solid State Physics," Seventh Edition, John Wiley & Sons, Inc., NY, 1996, pp. 611-627; (ii) Smart and Moore, "Solid State Chemistry, An Introduction," Chapman & Hall University and Professional Division, London, 1992, pp. 136-151; and (iii) James F. Shackelford, "Introduction to Materials Science for Engineers," Sixth Edition, Pearson Prentice Hall, New Jersey, 2005, pp. 404-418.)

Again referring to the "$AlO_xN_y$," "$SiO_xN_y$," and "$Si_uAl_xO_yN_z$" materials in the disclosure associated with the protective film 90, the subscripts allow those with ordinary skill in the art to reference these materials as a class of materials without specifying particular subscript values. That is, to speak generally about an alloy, such as aluminum oxide, without specifying the particular subscript values, we can speak of $Al_vO_x$. The description $Al_vO_x$ can represent either $Al_2O_3$ or $Al_{0.4}O_{0.6}$. If v+x were chosen to sum to 1 (i.e. v+x=1), then the formula would be an atomic fraction description. Similarly, more complicated mixtures can be described, such as $Si_uAl_vO_xN_y$, where again, if the sum u+v+x+y were equal to 1, we would have the atomic fractions description case.

Once again referring to the "$AlO_xN_y$," "$SiO_xN_y$," and "$Si_uAl_xO_yN_z$" materials in the disclosure, these notations allow those with ordinary skill in the art to readily make comparisons to these materials and others. That is, atomic fraction formulas are sometimes easier to use in comparisons. For instance; an example alloy consisting of $(Al_2O_3)_{0.3}(AlN)_{0.7}$ is closely equivalent to the formula descriptions $Al_{0.448}O_{0.31}N_{0.241}$ and also $Al_{367}O_{254}N_{198}$. Another example alloy consisting of $(Al_2O_3)_{0.4}(AlN)_{0.6}$ is closely equivalent to the formula descriptions $Al_{0.438}O_{0.375}N_{0.188}$ and $Al_{37}O_{32}N_{16}$. The atomic fraction formulas $Al_{0.448}O_{0.31}N_{0.241}$ and $Al_{0.438}O_{0.375}N_{0.188}$ are relatively easy to compare to one another. For instance, Al decreased in atomic fraction by 0.01, O increased in atomic fraction by 0.065 and N decreased in atomic fraction by 0.053. It takes more detailed calculation and consideration to compare the whole number formula descriptions $Al_{367}O_{254}N_{198}$ and $Al_{37}O_{32}N_{16}$. Therefore, it is sometimes preferable to use atomic fraction formula descriptions of solids. Nonetheless, the use of $Al_vO_xN_y$ is general since it captures any alloy containing Al, O and N atoms.

Figures 1A, 1B, 1C:
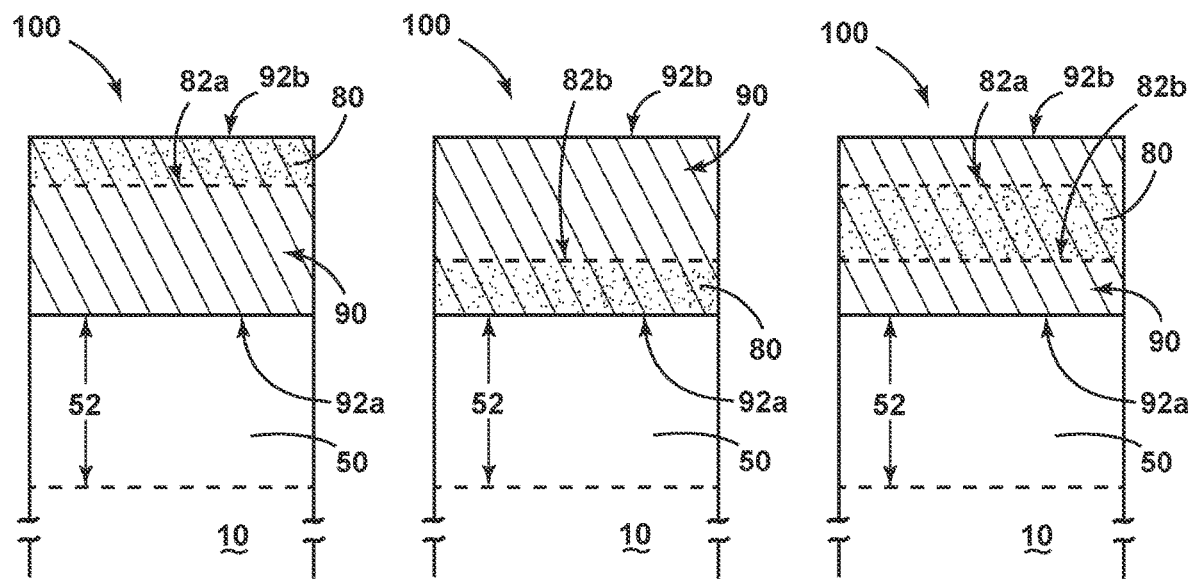
FIG. 1A is an enlarged, cross-sectional schematic view of the article depicted in FIG. 1 at Section 1A, as configured with a graded protective film with a varying constituent concentration in proximity to the exposed surface of the film, according to some embodiments.
FIG. 1B is an enlarged, cross-sectional schematic view of the article depicted in FIG. 1 at Section 1B, as configured with a graded protective film with a varying constituent concentration in proximity to the interface of the film and the substrate, according to some embodiments.
FIG. 1C is an enlarged, cross-sectional schematic view of the article depicted in FIG. 1 at Section 1C, as configured with a graded protective film with a varying constituent concentration in the bulk of the film, according to some embodiments.

Referring again to the article 100 depicted in FIG. 1, the protective film 90 comprises a metal oxynitride or a metal nitride that is graded such that a respective oxygen and/or nitrogen concentration in the film varies by 1.3 or more atomic %. That is, the protective film 90 comprises one or more regions within its thickness 94 in which its concentration of oxygen and/or nitrogen varies by 1.3 or more atomic % (e.g., from 4 atomic % to 2.7 atomic %, from 1 atomic % to 2.3 atomic %, etc.). In some implementations of the article 100, the grading of the protective film 90 is such that a respective oxygen and/or nitrogen concentration in the film varies by 1 or more %, for example 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3%, 3.5%, 4%, 4.5%, 5%, or further amounts within these levels, as measured by atomic percent. In other implementations of the article 100, the thickness of the graded region within the protective film 90 is defined by the region in the film 90 in which the constituent (e.g., oxygen, nitrogen, etc.) demonstrates a change of 2.6 or more atomic % per micron. Hence, the graded region is bound by non-graded regions in which the constituent concentration is constant or otherwise varies by less than 2.6 atomic % per micron. In some embodiments of the article 100, the thickness of the graded region (e.g., the graded region 80 as shown in FIGS. 1A-1C, outlined in detail below) of the protective film 90 is 500 nm or more. In other embodiments, the protective film 90 comprises a graded region that spans the full thickness 94 of the film.

As described herein, the elemental concentration levels (e.g., oxygen concentration levels) specified for the protective film 90 and the concentration data reported herein in the subsequent Examples are defined and obtained through x-ray photoelectron spectroscopy (XPS). These XPS-derived levels and XPS data were, or are to be, obtained on XPS equipment with procedures understood by those with ordinary skill in the field of the disclosure.

Referring now to FIGS. 1A-1C, various embodiments of the protective film 90 of the article 100 (as shown FIG. 1) are shown. With regard to FIG. 1A, a graded protective film 90 of the article 100 is depicted as comprising a metal oxynitride or a metal nitride with a varying constituent concentration (i.e., oxygen and/or nitrogen) in proximity to the exposed surface 92b of the film 90, according to some embodiments. In this configuration of the article 100, the protective film 90 defines an interface 92a with the primary surface 12 of the substrate 10 (see FIG. 1). As also shown in FIG. 1A, the exposed surface 92b is opposed to the interface 92a. Further, the oxygen and/or nitrogen concentration within the film 90 varies from the exposed surface 92b to a first depth 82a, e.g., by 1.3 or more atomic %, by 2.0 or more atomic %, or other varying amount, to define a graded region 80 within the film 90. Accordingly, the bulk of the film 90 outside of the graded region 80, in some aspects, may have a substantially constant concentration of the same oxygen and/or nitrogen constituents. In other implementations, the bulk of the film 90 outside of the graded region 80 can also possess oxygen and/or nitrogen constituents that vary in concentration in a manner consistent with the graded region 80, or may vary in other magnitudes, defining concentration profiles that differ from those in the graded region 80.

With regard to FIG. 1B, a graded protective film 90 of the article 100 is depicted as comprising a metal oxynitride or a metal nitride with a varying constituent concentration (i.e., oxygen and/or nitrogen) in proximity to the interface 92a of the film 90, according to some embodiments. In this configuration of the article 100, the protective film 90 also defines an interface 92a with the primary surface 12 of the substrate 10 (see FIG. 1). As also shown in FIG. 1B, the exposed surface 92b of the film 90 is opposed to the interface 92a. Further, the oxygen and/or nitrogen concentration within the film 90 depicted in FIG. 1B varies from the interface 92a to a second depth 82b, e.g., by 1.3 or more atomic %, by 2.0 or more atomic %, or other varying amount, to define a graded region 80 within the film 90. Accordingly, the bulk of the film 90 outside of the graded region 80, in some aspects, may have a substantially constant concentration of the same oxygen and/or nitrogen constituents. In other implementations, the bulk of the film 90 outside of the graded region 80 can also possess oxygen and/or nitrogen constituents that vary in concentration in a manner consistent with the graded region 80, or may vary in other magnitudes, defining concentration profiles that differ from those in the graded region 80.

With regard to FIG. 1C, a graded protective film 90 of the article 100 is depicted as comprising a metal oxynitride or a metal nitride with a varying constituent concentration (i.e., oxygen and/or nitrogen) within the bulk of the film 90, according to some embodiments. In this configuration of the article 100, the protective film 90 again defines an interface 92a with the primary surface 12 of the substrate 10 (see FIG. 1). As also shown in FIG. 1C, the exposed surface 92b of the film 90 is opposed to the interface 92a. Further, the oxygen and/or nitrogen concentration within the bulk of the film 90 varies from a first depth 82a to a second depth 82b, between the exposed surface 92b to the interface 92a, e.g., by 1.3 or more atomic %, by 2.0 or more atomic %, or other varying amount, to define a graded region 80 within the film 90. Accordingly, the bulk of the film 90 outside of the graded region 80, in some aspects, may have a substantially constant concentration of the same oxygen and/or nitrogen constituents. In other implementations of the film 90 depicted in FIG. 1C, the bulk of the film 90 outside of the graded region 80 can also possess oxygen and/or nitrogen constituents that vary in concentration in a manner consistent with the graded region 80, or may vary in other magnitudes, defining concentration profiles that differ from those in the graded region 80.

As noted earlier, embodiments of the disclosure generally pertain to articles 100 having high strength, hardness and scratch-resistance. In particular, these articles 100 can possess graded protective films 90 characterized by high toughness and hardness, which can contribute to articles 100 with higher scratch resistance and toughness than conventional, comparable articles without such graded protective films. Various material and mechanical property attributes associated with the articles 100 and/or the protective films 90 are indicative of these properties, as described in exemplary form in the following sections of this disclosure.

Conventional approaches to increasing the toughness of relatively high modulus substrates, such as glass substrates, with high modulus films includes the use of thinner films, increasing film compressive stress and/or decreasing the elastic modulus of the film. These approaches can be successful in increasing the toughness of the underlying substrate, but generally result in trade-offs that negatively impact the devices and assemblies employing these articles, such as reduced scratch-resistance and/or reduced optical properties. In contrast, articles 100 of the disclosure employ graded protective films, some of which employ small graded regions within the film, all of which unexpectedly confer added fracture toughness to the article 100, as measured on the substrate 10 and the film 90 and evidenced by increased COS levels.

In some embodiments of the article 100 depicted in FIG. 1, and the protective films 90 depicted in FIGS. 1A-1C, the protective film 90 is characterized by a fracture toughness of greater than about 1 MPa·m$^{1/2}$, greater than about 2 MPa·m$^{1/2}$, greater than about 3 MPa·m$^{1/2}$, greater than about 4 MPa·m$^{1/2}$, or even greater than about 5 MPa·m$^{1/2}$. Fracture toughness of thin films is measured as described in D. S Harding, W. C. Oliver, and G. M. Pharr, "Cracking During Nanoindentation and its Use in the Measurement of Fracture Toughness," Mat. Res. Soc. Symp. Proc., vol. 356, 1995, 663-668. The toughness of the protective film 90 and/or the substrate 10 (i.e., as incorporated into an article 100 with a protective film 90) can also be manifested in high COS values, in some implementations. For example, the protective film 90 can be characterized by a COS of greater than 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, and higher, all as measured by ROR test. As another example, substrate 10 can be characterized by a COS of greater than 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3% and higher, all as measured by ROR test. It should also be understood that the presence of a compressive stress region 50 in the substrate 10, according to some embodiments of the articles 100, can further influence the substrate COS associated with the substrate 10.

As used herein, a "ring-on-ring" or "ROR" test uses the following procedure for measuring load-to-failure, failure strength, and strain-to-failure values. An article (e.g., the article 100) is positioned between the bottom ring and the top ring of a ring-on-ring mechanical testing device. The top ring and the bottom ring have different diameters. As used herein, the top ring has a diameter of 12.7 mm and the bottom ring has a diameter of 25.4 mm. The portion of the top ring and bottom ring which contact the article 100 and protective film 90 are circular in cross section and each have a radius of 1.6 mm. The top ring and bottom ring are made of steel. Testing is performed in an environment of about 22° C. with 45%-55% relative humidity. The articles used for testing are 50 mm by 50 mm squares in size.

To determine the strain-to-failure of the article 100 and/or the protective film 90, force is applied to the top ring in a downward direction and/or to the bottom ring in an upward direction, using a loading/cross-head speed of 1.2 mm/minute. The force on the top ring and/or the bottom ring is increased, causing strain in the article 100 until catastrophic failure of one or both of the substrate 10 and the film 90. A light and camera are provided below the bottom ring to record the catastrophic failure during testing. An electronic controller, such as a Dewetron acquisition system, is provided to coordinate the camera images with the applied load to determine the load when catastrophic damage is observed by the camera. To determine the strain-to-failure, camera images and load signals are synchronized through the Dewetron system, so that the load at which the protective film 90 shows failure can be determined. The load-to-failure of the article 100 can also be recorded using stress or strain gauges rather than this camera system, though the camera system is typically preferred for independently measuring the failure levels of the film 90. Finite element analysis, as found in Hu, G., et al., "Dynamic fracturing of strengthened glass under biaxial tensile loading," Journal of Non-Crystalline Solids, 2014. 405(0): p. 153-158, is used to analyze the strain levels the sample is experiencing at this load. The element size may be chosen to be fine enough to be representative of the stress concentration underneath the loading ring. The strain level is averaged over 30 nodal points or more underneath the loading ring. According to other implementations, the article 100 may have a Weibull characteristic load-to-failure greater than about 200 kgf, greater than 250 kgf, or even greater than 300 kgf, for a 0.7 mm thick article 100 measured in ROR testing procedure. In these ROR tests, the side of the substrate 10 with the protective film 90 is placed in tension and, typically, this is the side that fails.

In addition to average load, stress (strength), and strain-to-failure, a Weibull characteristic load, stress, or strain-to-failure may be calculated. The Weibull characteristic load to failure (also called the Weibull scale parameter) is the load level at which a brittle material's failure probability is 63.2%, calculated using known statistical methods. Using these load-to-failure values, sample geometry, and numerical analysis of the ROR test setup and geometry described above, a Weibull characteristic strain-to-failure value can be calculated for the article 100 of greater than 0.8%, greater than 1%, or even greater than 1.2% and/or a Weibull characteristic strength (stress at failure) value greater than 600 MPa, 800 MPa, or 1000 MPa. As recognized by those with ordinary skill in the field of the disclosure, strain-to-failure and Weibull characteristic strength values, as compared to failure load values, can apply more broadly to different variations of the article 100, e.g., as varied with regard to substrate thickness, shape, and/or different loading or testing geometries. Without being bound by theory, the articles 100 may further comprise a Weibull modulus (i.e., a Weibull 'shape factor', or slope of a Weibull plot for samples loaded up to failure, using failure load, failure strain, failure stress, or more than one of these metrics) of greater than about 3.0, greater than about 4.0, greater than about 5.0, greater than about 8.0, or even greater than about 10, all as measured by the ROR flexural test. Finite element analysis, as described above, is used to analyze the strain levels the article 100 is experiencing at the failure load, and the failure strain levels can then be translated to failure stress (i.e., strength) values using the known relationship strain=stress× elastic modulus.

As used herein, the terms "strain-to-failure" and "average strain-to-failure" refer to the strain at which cracks in the protective film 90 and/or the substrate 10 propagate without application of additional load, typically leading to optically visible failure in a given material, layer or film and, perhaps even bridge to another material, layer, or film, as defined herein. Strain-to-failure values are measured using ROR testing.

Again referring to the article 100 depicted in FIG. 1, and the protective films 90 shown in FIGS. 1A-1C, the high toughness of the film 90 and the article 100 can also be manifested in pass-fail measurements obtained from a Pencil Test. For example, protective film 90 can be characterized by a "pass" or a "fail" in a Pencil Test. As used herein, the "Pencil Test" is conducted on articles, such as articles 100, according to the following protocol and test configuration. In particular, an article 100 with a protective film 90 is placed face down on a transparent plastic film and a soft, compliant pad (e.g., a typical computer mousepad). That is, the protective film is placed in contact with the transparent film, and the film is in contact with the pad. The pad supports the article 100 (as including the substrate 10 and protective film 90), which allows the article to flex when it is pressed by a pencil on the exposed surface of the substrate 10 away from the protective film such that the protective film is placed in tension. The test is conducted simply by manually applying the eraser end of a standard pencil against the bottom surface of the article (opposed from the protective film) with about 15 pounds of force, and visually assessing whether the article has cracked (i.e., a "fail") or has flexed without cracking (i.e., a "pass").

According to some embodiments of the article 100 depicted in FIG. 1, the protective film 90 can be transparent or substantially transparent. In some preferred embodiments, the protective film 90 is characterized by an optical transmittance within the visible spectrum of greater than 50%, greater than 60%, greater than 70%, greater than 80%, greater than 90%, and all values between these lower limit transmittance levels. In other implementations, the protective film can be characterized by an optical transmittance in the visible spectrum of greater than 20%, greater than 30%, greater than 40%, greater than 50%, greater than 60%, greater than 70%, greater than 80%, greater than 90%, and all values between these lower limit transmittance levels.

In embodiments, the article 100 depicted in FIG. 1 can comprise a haze through the protective film 90 and the substrate 10 of less than or equal to about 5 percent. In certain aspects, the haze is equal to or less than 5 percent, 4.5 percent, 4 percent, 3.5 percent, 3 percent, 2.5 percent, 2 percent, 1.5 percent, 1 percent, 0.75 percent, 0.5 percent, or 0.25 percent (including all levels of haze between these levels) through the protective film 90 and the substrate 10. The measured haze may be as low as zero. As used herein, the "haze" attributes and measurements reported in the disclosure are as measured on, or otherwise based on measurements from, a BYK-Gardner haze meter.

The source materials of the protective film 90 may be deposited as a single layer film or a multilayer film, coating or structure. More generally, the protective film 90, whether in a single film or a multilayer structure, can be characterized by a selected thickness, i.e., thickness 94 (see FIG. 1). In some embodiments, the thickness 94 of a single layer or multilayer protective film 90 may be greater than or equal to 100 nm, 110 nm, 120 nm, 130 nm, 140 nm, 150 nm, 175 nm, 200 nm, or even greater lower thickness limits. In some embodiments, the thickness 94 of the single layer or multilayer protective film 90 may be less than or equal to 10,000 nm, 9,000 nm, 8,000 nm, 7,000 nm, 6,000 nm, 5,000 nm, 4,000 nm, 3,000 nm, 2000 nm, 1500 nm, 1000 nm or 500 nm. In further embodiments, the thickness 94 of the single layer or multilayer protective film 90 may be from about 100 nm to about 10,000 nm, from about 1,500 nm to about 10,000 nm, from about 1,500 nm to 5,000 nm, and all thickness values between these thicknesses. As understood by those with ordinary skill in the field of the disclosure, the thickness of the protective film 90 as reported herein was contemplated as being measured by scanning electron microscope (SEM) of a cross-section, by optical ellipsometry (e.g., by an n & k analyzer), or by thin film reflectometry. For multiple layer elements (e.g., a stack of layers), thickness measurements by SEM are preferred.

The protective film 90, as shown in FIGS. 1A-1C, as present in the article 100 depicted in FIG. 1, can be deposited using a variety of methods including physical vapor deposition ("PVD"), electron beam deposition ("e-beam" or "EB"), ion-assisted deposition-EB ("IAD-EB"), laser ablation, vacuum arc deposition, thermal evaporation, sputtering, plasma enhanced chemical vapor deposition (PECVD) and other similar deposition techniques. In some embodiments, the protective film 90 is formed over the substrate 10 by a vacuum deposition process (e.g., sputtering, metamode, etc.). In the vacuum deposition process, the concentration of reactive gases (e.g., oxygen, nitrogen, and others) can be varied to develop a graded region in the film 90, as manifested in varying chemical composition within the graded region. Further, the ratio of the reactive gases (e.g., oxygen and/or nitrogen) to that of inert carrier gases (e.g., argon) can be designed, according to the principles discussed herein, to maintain a desired chamber pressure and to deposit the film 90 such that it possesses an as-formed compressive stress or a neutral stress state (i.e., a residual film stress that is not substantially tensile or compressive in nature). As understood by those in the field of the disclosure, the total flow rate (e.g., in units of standard $cm^3$/min) of gases used in the vacuum deposition chamber can depend on the specific chamber design and other process parameters, all of which may be selected according to the principles discussed herein, to meet the product attributes. For example, one can adjust the flow rate of reactive gases from a high level to a low level during deposition of the protective film 90 to develop a gradient in the film (e.g., by adjusting an $O_2$ gas rate from 6 sccm to 4 sccm, while keeping other component gas flow rates constant).

According to some embodiments of the disclosure, a method of making an article 100 (see FIG. 1) can include the following steps: forming a substrate 10 having a glass, glass-ceramic or ceramic composition and comprising a primary surface 12; and disposing a protective film 90 (see FIGS. 1A-1C) over the primary surface 12 of the substrate 10 with a vacuum deposition process. The protective film 90 formed according to the method can comprises a thickness 94 of greater than 1.5 microns and a maximum hardness of greater than 15 GPa at a depth of 500 nanometers, as measured on the film 90 disposed on the substrate 10. Further, the protective film 90 can comprise a metal oxynitride or a metal nitride that is graded such that at least one of an oxygen concentration and a nitrogen concentration in the film 90 varies by 1.3 or more atomic %. In addition, the substrate 10 can comprise an elastic modulus less than an elastic modulus of the film 90. Further, in some embodiments, the metal oxynitride or the metal nitride of the protective film 90 is graded during the step of disposing the protective film 90 by varying a respective concentration of a reactive oxygen gas or a reactive nitrogen gas. According to some implementations, the step of disposing the protective film 90 can be conducted, as noted earlier, with a vacuum deposition process, such as sputtering.

Figure 2A:
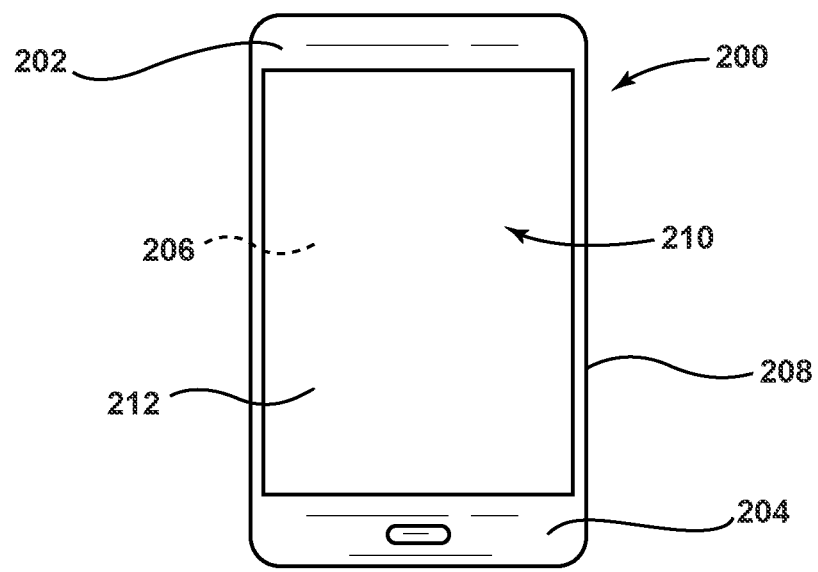
FIG. 2A is a plan view of an exemplary electronic device incorporating any of the articles disclosed herein.
Figure 2B:
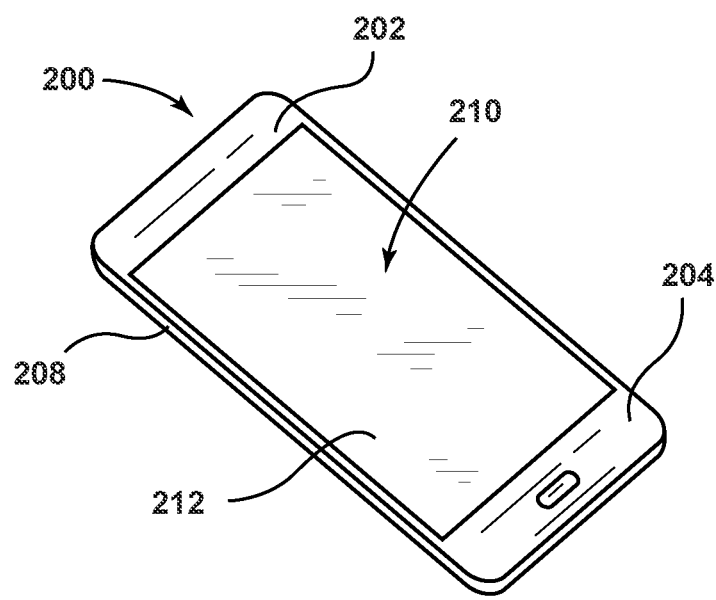
FIG. 2B is a perspective view of the exemplary electronic device of FIG. 2A.

The articles 100 disclosed herein may be incorporated into a device article such as a device article with a display (or display device articles) (e.g., consumer electronics, including mobile phones, tablets, computers, navigation systems, wearable devices (e.g., watches) and the like), augmented-reality displays, heads-up displays, glasses-based displays, architectural device articles, transportation device articles (e.g., automotive, trains, aircraft, sea craft, etc.), appliance device articles, or any device article that benefits from some transparency, scratch-resistance, abrasion resistance or a combination thereof. An exemplary device article incorporating any of the articles disclosed herein (e.g., as consistent with the articles 100 depicted in FIG. 1) is shown in FIGS. 2A and 2B. Specifically, FIGS. 2A and 2B show a consumer electronic device 200 including a housing 202 having front 204, back 206, and side surfaces 208; electrical components (not shown) that are at least partially inside or entirely within the housing and including at least a controller, a memory, and a display 210 at or adjacent to the front surface of the housing; and a cover substrate 212 at or over the front surface of the housing such that it is over the display. In some embodiments, the cover substrate 212 may include any of the articles disclosed herein. In some embodiments, at least one of a portion of the housing or the cover glass comprises the articles disclosed herein.

Figure 3:
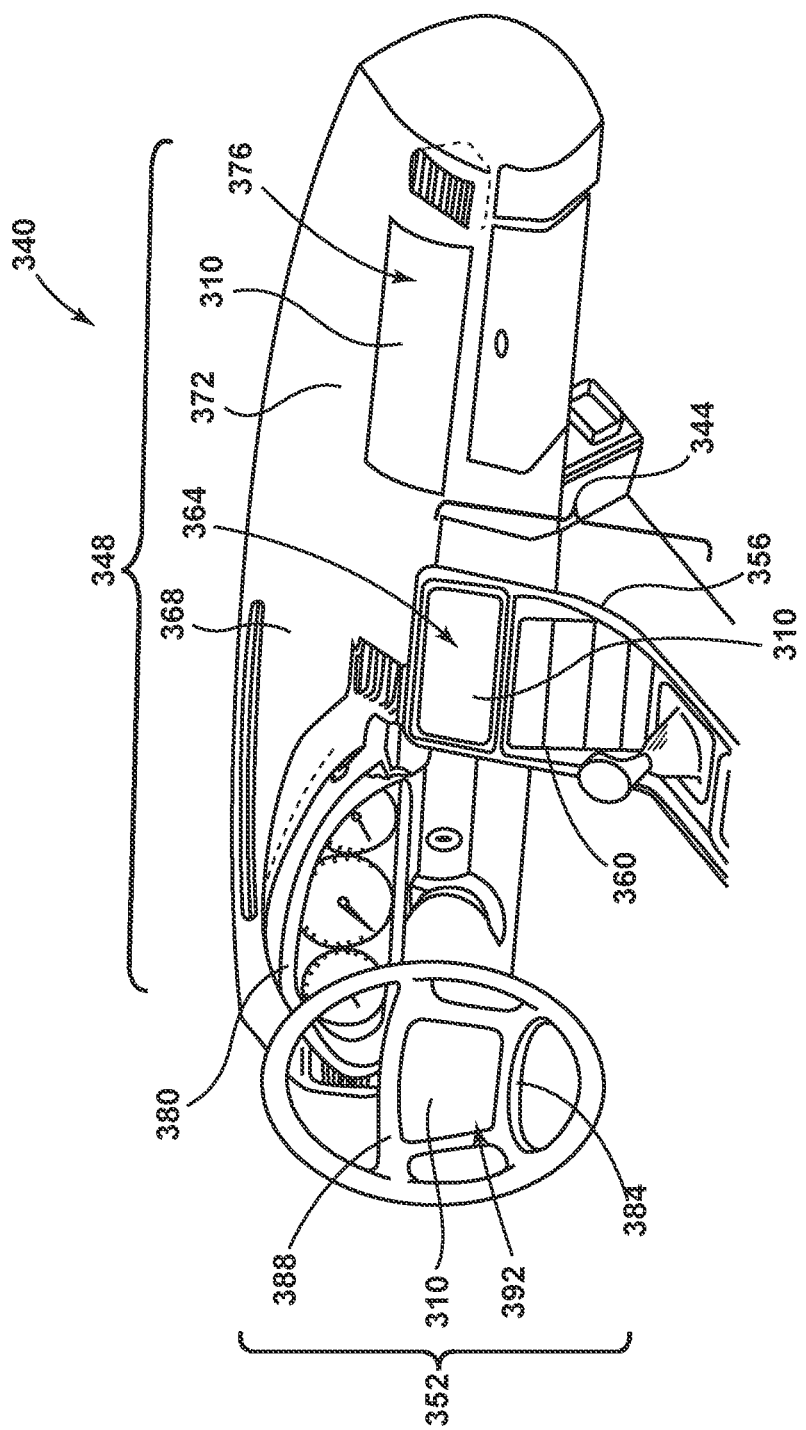
FIG. 3 is a perspective view of a vehicle interior with vehicular interior systems that may incorporate any of the articles disclosed herein.

According to some embodiments, the articles 100 (see FIGS. 1-1C) may be incorporated within a vehicle interior with vehicular interior systems, as depicted in FIG. 3. More particularly, the article 100 may be used in conjunction with a variety of vehicle interior systems. A vehicle interior 340 is depicted that includes three different examples of a vehicle interior system 344, 348, 352. Vehicle interior system 344 includes a center console base 356 with a surface 360 including a display 364. Vehicle interior system 348 includes a dashboard base 368 with a surface 372 including a display 376. The dashboard base 368 typically includes an instrument panel 380 which may also include a display. Vehicle interior system 352 includes a dashboard steering wheel base 384 with a surface 388 and a display 392. In one or more examples, the vehicle interior system may include a base that is an armrest, a pillar, a seat back, a floor board, a headrest, a door panel, or any portion of the interior of a vehicle that includes a surface. It will be understood that the article 100 described herein can be used interchangeably in each of vehicle interior systems 344, 348 and 352.

According to some embodiments, the articles 100 may be used in a passive optical element, such as a lens, window, lighting cover, eyeglass lens, sunglass lens, or other optical element that may or may not be integrated with an electronic display or electrically active device.

Referring again to FIG. 3, the displays 364, 376 and 392 may each include a housing having front, back, and side surfaces. At least one electrical component is at least partially within the housing. A display element is at or adjacent to the front surface of the housings. The article 100 (see FIG. 1) is disposed over the display elements. It will be understood that the article 100 may also be used on, or in conjunction with, the armrest, the pillar, the seat back, the floor board, the headrest, the door panel, or any portion of the interior of a vehicle that includes a surface as explained above. According to various examples, the displays 364, 376 and 392 may be a vehicle visual display system or vehicle infotainment system. It will be understood that the article 100 may be incorporated in a variety of displays and structural components of autonomous vehicles and that the description provided herein with relation to conventional vehicles is not limiting.

EXAMPLES

Various non-limiting embodiments of the articles 100 and protective film 90 of the disclosure are further clarified by the following examples.

Example 1

As detailed below in Tables 1A and 1B, various articles were fabricated according to the disclosure as including glass substrates having 1 (GC1—nominal composition in mol % of: 67.4% $SiO_2$; 3.7% $B_2O_3$; 12.7% $Al_2O_3$; 13.8% $Na_2O$; and 2.4% MgO) and Glass Composition 2 (GC2—nominal composition in mol % of: 57.4% $SiO_2$; 16.1% $Al_2O_3$; 17.1% $Na_2O$; 2.8% MgO; and 6.5% $P_2O_5$) and graded protective films comprising an aluminum oxynitride. These samples are denoted Examples 1A-1F ("Ex. 1A" through "Ex. 1F"), as including the particular substrate composition denoted in Table 1. Further, the Comparative Samples 1A-1C ("Comp. Ex. 1A," "Comp. Ex. 1B" and "Comp. Ex. 1C") listed in Tables 1A and 1B are fabricated with GC1 or GC2 glass substrates and non-graded protective films comprising an aluminum oxynitride composition.

With regard to Table 1A, mechanical properties associated with the protective film of the sample articles are listed. Further, Pencil Test performance data for the sample articles is also listed in Table 1A. As is evident from the data in Table 1, the articles of the disclosure employing graded protective film (Exs. 1A-1E) passed the Pencil test. These samples employed graded protective films with hardness and elastic modulus values that ranged from 17.7 to 20.7 GPa and 187 to 235 GPa, respectively. In contrast, the comparative sample articles (Comp. Exs. 1A-1C) all failed the Pencil Test, while employing protective films with hardness and elastic modulus values that are comparable to those of the inventive articles (i.e., Exs. 1A-1E). Accordingly, the graded protective films of the inventive samples have comparable mechanical properties as those of the non-graded films employed in the comparative samples, yet the inventive articles demonstrated superior performance in the article-level Pencil Test.

X-ray photoelectron spectroscopy (XPS) data for each of the protective films of the articles in Table 1A is listed below in Table 1B. Oxygen gradients of 1.3 atomic % or more are evident in the graded aluminum oxynitride protective films of the inventive samples (Exs. 1A-1F) and oxygen gradients of 0.7 atomic % or less are evident in the non-graded aluminum oxynitride protective films of the comparative samples (Comp. Exs. 1A-1C). Significantly greater aluminum and nitrogen gradients are also observed in the protective films of the inventive articles as compared to the comparative articles. Accordingly, it is believed that the graded nature of the protective films in the inventive articles contributes to their superior mechanical performance in the Pencil Test (see Table 1A) as compared to the comparative articles with non-graded protective films.

TABLE 1A

| Sample ID | Substrate | Graded Film? | Pencil Test | Film Hardness (GPa) | Film Elastic Modulus (GPa) |
| --- | --- | --- | --- | --- | --- |
| Ex. 1E | GC1 | Yes | Pass | 19.0 | 201.0 |
| Ex. 1D | GC1 | Yes | Pass | 19.2 | 214.0 |
| Comp. Ex. 1A | GC1 | No | Fail | 17.8 | 200.0 |
| Comp. Ex. 1B | GC1 | No | Fail | 20.6 | 201 |
| Comp. Ex. 1C | GC2 | No | Fail | 20.7 | 206 |
| Ex. 1C | GC2 | Yes | Pass | 18.8 | 200.0 |
| Ex. 1F | GC1 | Yes | Pass | 20.7 | 235 |
| Ex. 1B | GC2 | Yes | Pass | 17.7 | 187 |
| Ex. 1A | GC2 | Yes | Pass | 17.7 | 202.0 |

TABLE 1B

| Sample ID | Substrate | [N]-G | [O]-G | [Al]-G | [N]-NG | [O]-NG | [Al]-NG | Δ[O] | Δ[N] | Δ[Al] |
| --- | --- | --- | --- | --- | --- | --- | --- | --- | --- | --- |
| Ex. 1E | GC1 | 35.5 | 14.4 | 50.0 | 36.6 | 12.6 | 50.8 | 1.8 | 1.1 | 0.7 |
| Ex. 1D | GC1 | 35.2 | 14.1 | 50.7 | 35.6 | 12.8 | 51.6 | 1.3 | 0.4 | 0.9 |
| Comp. Ex. 1A | GC1 | 36.4 | 13.3 | 49.7 | 37.0 | 12.6 | 50.3 | 0.7 | 0.6 | 0.6 |
| Comp. Ex. 1B | GC1 | 37.9 | 11.8 | 50.4 | 38.2 | 11.9 | 49.9 | −0.1 | 0.4 | −0.5 |
| Comp. Ex. 1C | GC2 | 37.7 | 11.5 | 50.8 | 37.9 | 11.6 | 50.5 | −0.1 | 0.2 | −0.3 |
| Ex. 1C | GC2 | 33.2 | 16.4 | 50.4 | 35.9 | 14.3 | 49.8 | 2.1 | 2.7 | −0.6 |
| Ex. 1F | GC1 | 35.8 | 13.7 | 50.5 | 37.6 | 11.8 | 50.5 | 1.8 | 1.8 | 0.0 |
| Ex. 1B | GC2 | 33.1 | 16.7 | 50.3 | 35.2 | 14.2 | 50.6 | 2.5 | 2.2 | 0.4 |
| Ex. 1A | GC2 | 31.5 | 19.5 | 49.0 | 33.9 | 16.1 | 50.0 | 3.4 | 2.3 | 1.1 |

Figure 4:
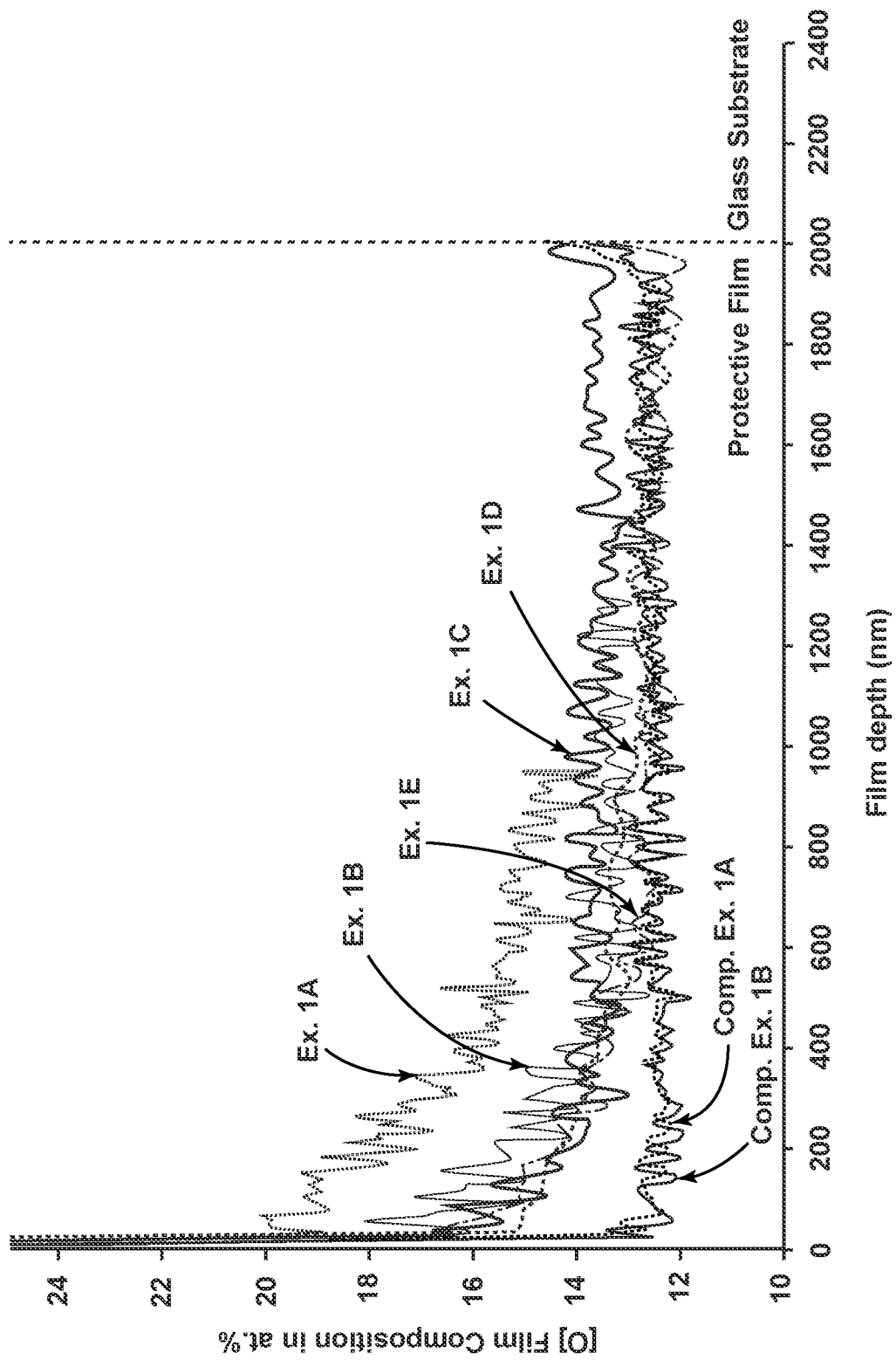
FIG. 4 is a plot of oxygen concentration, obtained from x-ray photoelectron spectroscopy (XPS) testing, as a function of depth in graded and comparative non-graded metal oxynitride-containing protective films disposed over glass substrates, according to embodiments of the disclosure.

Notes:
[N/O/Al]-G denotes nitrogen/oxygen/aluminum atomic % in graded region
[N/O/Al]-NG denotes nitrogen/oxygen/aluminum atomic % in non-graded region
Δ[N/O/Al] denotes the difference in atomic % from the graded to non-graded regions Referring now to FIG. 4, a plot of the XPS-derived oxygen concentration levels in the aluminum oxynitride protective films as a function of film depth of certain of the samples depicted above in Tables 1A and 1B is provided. In particular, XPS data is provided for five inventive samples Exs. 1A-1E with a graded protective film and two comparative examples (Comp. Exs. 1A and 1B) with a non-graded protective film. As is evident from the data shown in FIG. 4, the oxygen gradient in the inventive samples is generally present from the exposed surface of the film down to a depth of about 600 nm to about 1000 nm within the film. At that point, the oxygen levels in the films of these samples generally levels out. In contrast, the oxygen level in the films of the comparative samples is generally constant throughout the thickness of the film.

Example 2

Figure 5:
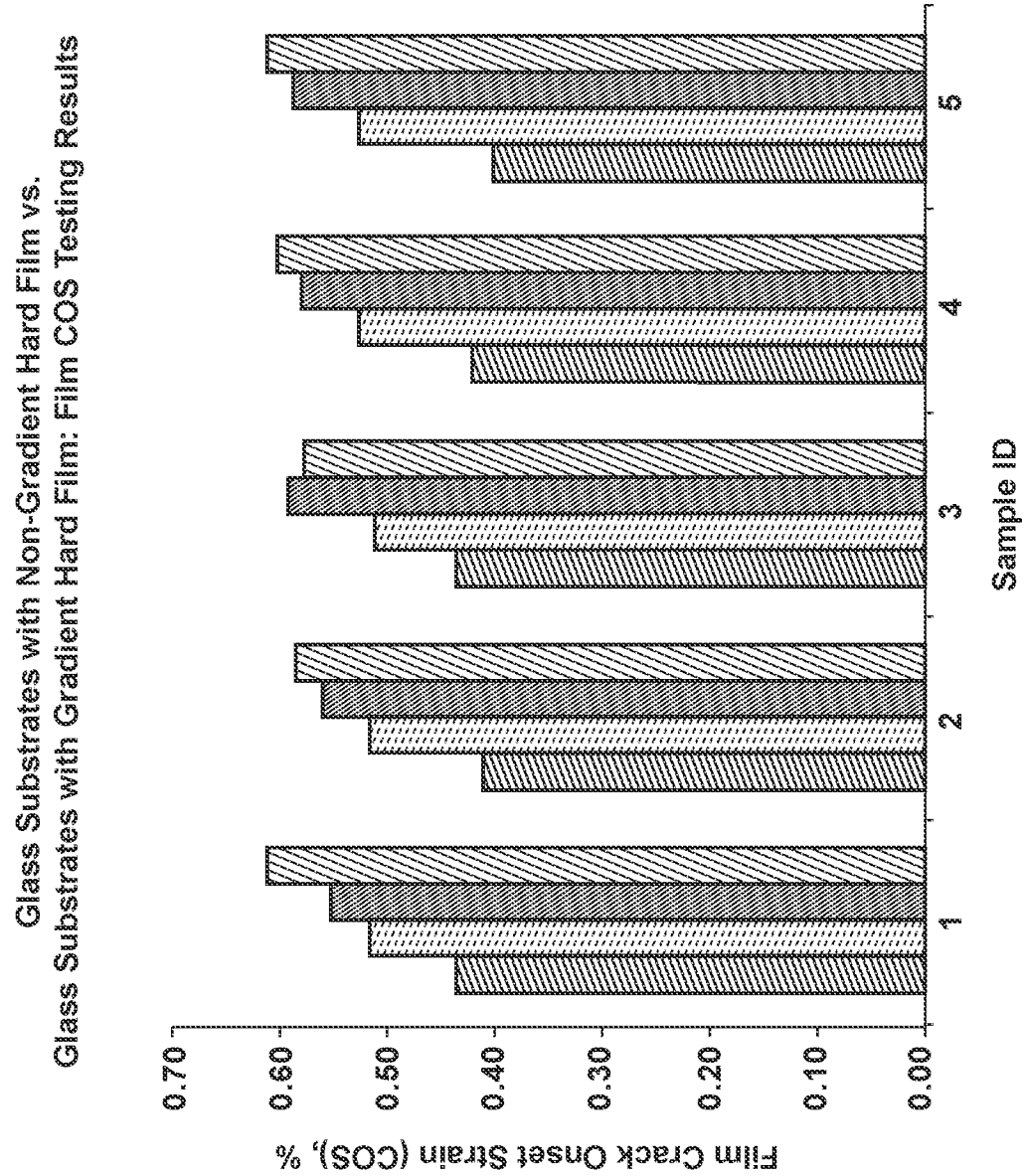
FIG. 5 is a plot of protective film COS percent values, obtained from ring-on-ring (ROR) testing, for articles comprising graded and comparative non-graded metal oxynitride-containing protective films over ion-exchange strengthened glass substrates, according to embodiments of the disclosure.
Figure 6:
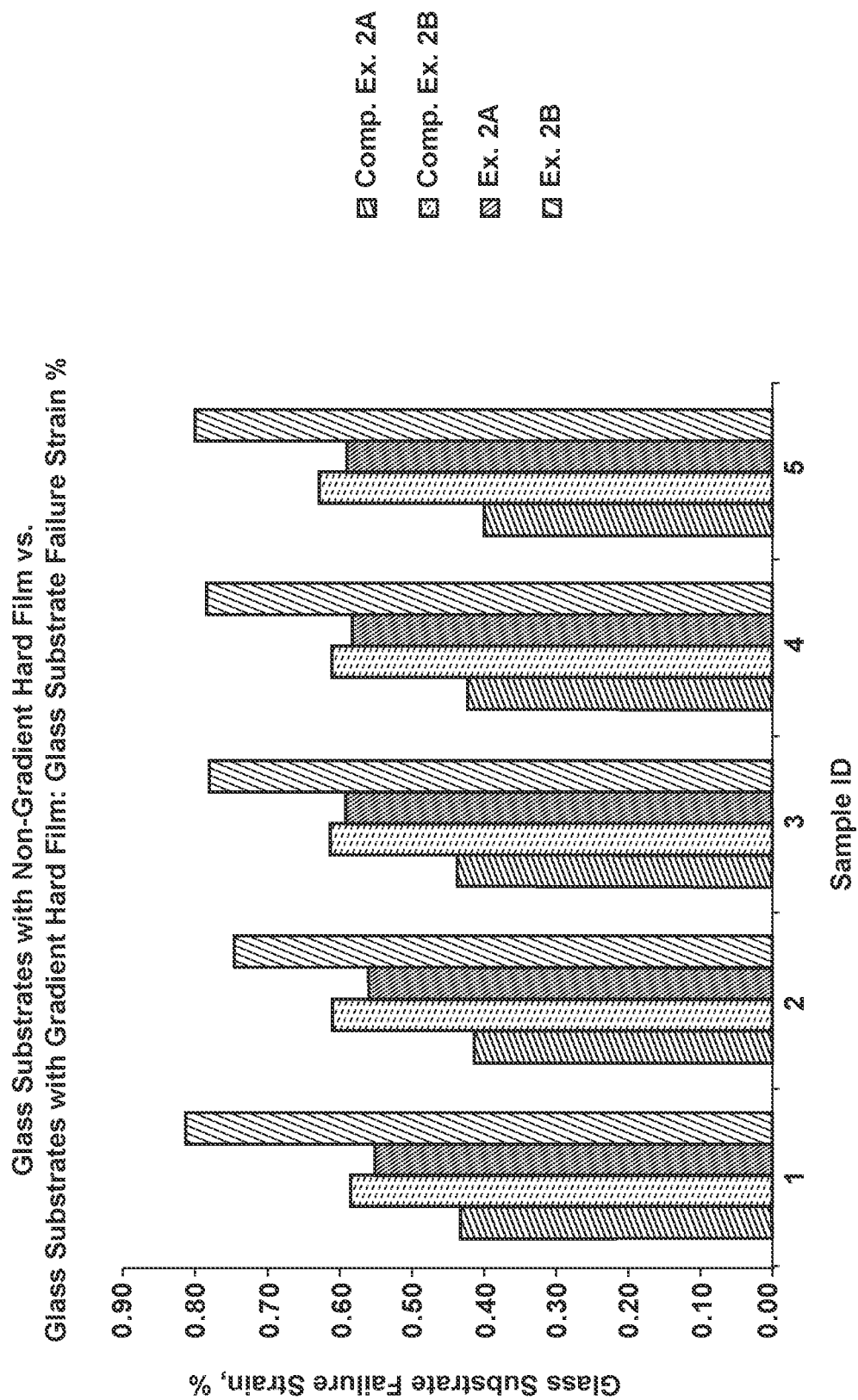
FIG. 6 is a plot of glass substrate failure strain percent values, obtained from ROR testing, for articles comprising graded and comparative non-graded metal oxynitride-containing protective films over ion-exchange strengthened glass substrates, according to embodiments of the disclosure.

In this example, various articles were fabricated according to the disclosure as including glass substrates having Glass Compositions GC1 and GC2 (as noted above) and graded protective films comprising an aluminum oxynitride. These samples are denoted Examples 2A and 2B ("Ex. 2A" and "Ex. 2B"), as including GC2 and GC1 glass substrate compositions. Further, the Comparative Samples 2A and 2B ("Comp. Ex. 2A" and "Comp. Ex. 2B") were similarly fabricated with GC2 and GC1 glass substrates, respectively, and non-graded protective films comprising an aluminum oxynitride composition. As shown in FIGS. 5 and 6, data from ROR testing of Examples 2A and 2B and Comparative Examples 2A and 2B is shown in bar chart form. In particular, FIGS. 5 and 6 depict protective film COS levels (%) and substrate failure strain levels (%) for five samples from each of the denoted sample configurations. As is evident from the data in FIG. 5, both of the inventive samples (Exs. 2A and 2B) demonstrate a graded protective film COS level of about 0.55% to about 0.61% and the comparative samples (Comp. Exs. 2A and 2B) demonstrate a non-graded protective film COS level from about 0.4 to about 0.5%. Similarly, as is evident from the data in FIG. 6, both of the inventive samples with graded protective films (Exs. 2A and 2B) demonstrate a substrate failure strain level of about 0.55% to about 0.8% and the comparative samples with non-graded protective films (Comp. Exs. 2A and 2B) demonstrate a substrate failure strain level from about 0.4 to about 0.62%. As such, it is evident from the data in FIGS. 5 and 6 that the presence of the graded protective film tends to increase protective film COS levels and substrate failure strain levels, both indicators of the increased toughness associated with the inventive articles of the disclosure.

Example 3

Figure 7:
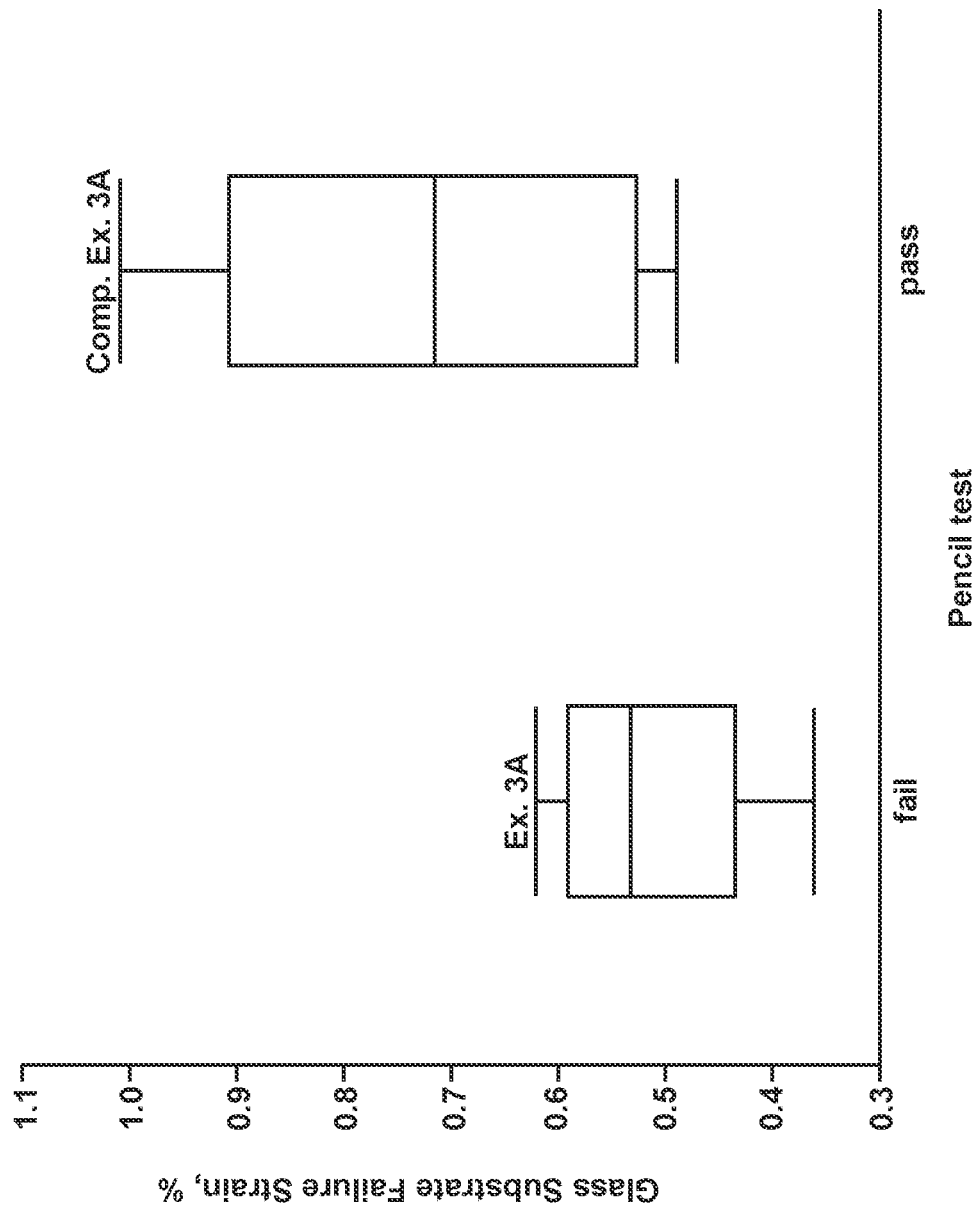
FIG. 7 is a box plot of glass substrate failure strain percent values, obtained from a pencil testing protocol, of articles comprising graded and comparative non-graded metal oxynitride-containing protective films over ion-exchange strengthened glass substrates, according to embodiments of the disclosure.

In this example, various articles were fabricated according to the disclosure as including glass substrates having Glass Compositions GC1 and GC2 and graded protective films comprising an aluminum oxynitride or non-graded protective films comprising an aluminum oxynitride. These inventive and comparative articles (Ex. 3A and Comp. Ex. 3A, respectively) were then subjected to testing according to the Pencil Test, as outlined earlier in the disclosure. As shown in the box plot of FIG. 7, the inventive samples all passed the Pencil Test and these same samples exhibited a median glass substrate failure strain level of about 0.72%, as measured from ROR testing. In contrast, the comparative samples all failed the Pencil Test and exhibited a median glass substrate failure strain level of about 0.53%, as measured from ROR testing. Accordingly, the improved glass substrate failure strain level of the inventive samples appears to be an indicator of successful Pencil Test performance. In contrast, the lower glass failure strain level of the comparative samples appears to be an indicator of unsuccessful Pencil Test performance.

Many variations and modifications may be made to the above-described embodiments of the disclosure without departing substantially from the spirit and various principles of the disclosure. All such modifications and variations are intended to be included herein within the scope of this disclosure and protected by the following claims.

What is claimed is:

1. An article, comprising:
a substrate comprising a glass, glass-ceramic or ceramic composition and comprising a primary surface; and
a protective film disposed on the primary surface of the substrate,
wherein the protective film comprises a metal oxynitride comprising a graded region that is graded such that an oxygen concentration in the film varies by 1.3 or more atomic %,
wherein the protective film further comprises a non-graded region, wherein the graded region is bounded by the primary surface of the substrate and the non-graded region,
wherein the oxygen concentration in the graded region decreases from the primary surface of the substrate to the non-graded region, and
wherein the protective film comprises a crack onset strain (COS) failure level of 0.5% or greater.

2. The article according to claim 1, wherein the protective film has a maximum hardness of greater than 12 GPa at a depth of 500 nanometers, as measured on the protective film disposed on the substrate.

3. The article according to claim 1, wherein the substrate comprises an elastic modulus less than an elastic modulus of the protective film.

4. The article according to claim 1, wherein a thickness of the graded region is greater than or equal to 120 nm.

5. The article according to claim 1, wherein the protective film comprises a thickness of greater than 0.6 microns.

6. The article according to claim 1, wherein the metal oxynitride of the protective film is graded such that the oxygen concentration through the thickness of the film varies by 2 or more atomic %.

7. The article according to claim 1, wherein the protective film comprises an aluminum oxynitride, a silicon aluminum oxynitride or a silicon oxynitride.

8. The article according to claim 1, wherein the protective film further comprises an elastic modulus of greater than 160 GPa.

9. The article according to claim 1, wherein the substrate comprises a glass composition and further comprises a compressive stress region that extends from the primary surface to a depth of compressive stress (DOC) in the substrate, the compressive stress region comprising a maximum compressive stress (CS) of 150 MPa with a DOC at 10 microns or deeper.

10. The article according to claim 1, wherein the metal oxynitride of the protective film is graded such that a nitrogen concentration in the film varies by 1.3 or more atomic %.

11. A consumer electronic product, comprising:
a housing comprising front, back and side surfaces;
electrical components that are at least partially inside the housing; and
a display at or adjacent to the front surface of the housing,
wherein the article of claim 1 is at least one of disposed over the display and disposed as a portion of the housing.

\* \* \* \* \*